Nov. 15, 1955
E. F. ROWLAND
2,723,632
DRIVE ATTACHMENT FOR TRACTOR-MOUNTED
SEEDER AND CULTIVATOR
Filed March 29, 1952
2 Sheets-Sheet 2
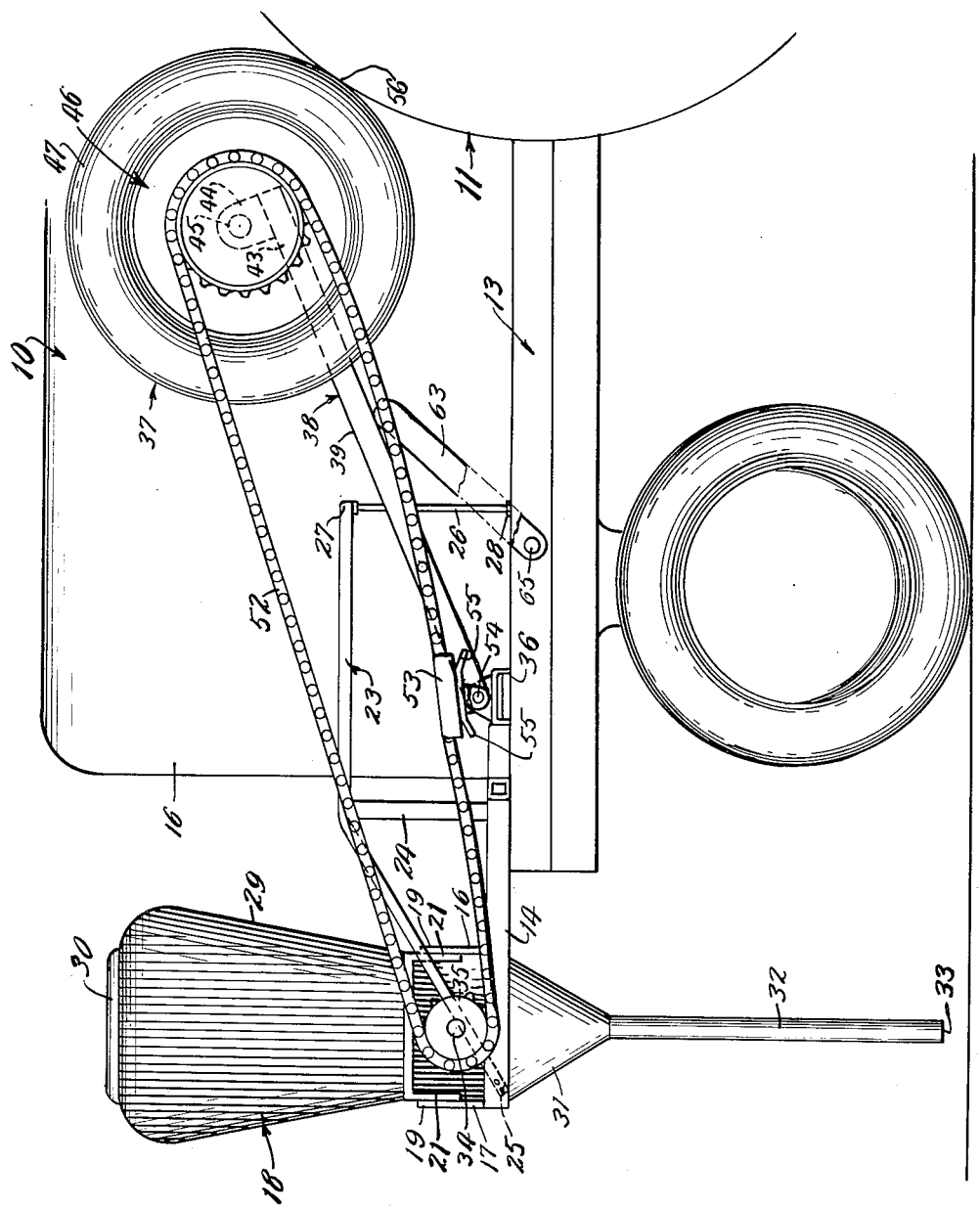
INVENTOR.
Elmer F. Rowland
BY
Robert H. Wendt.
Atty.

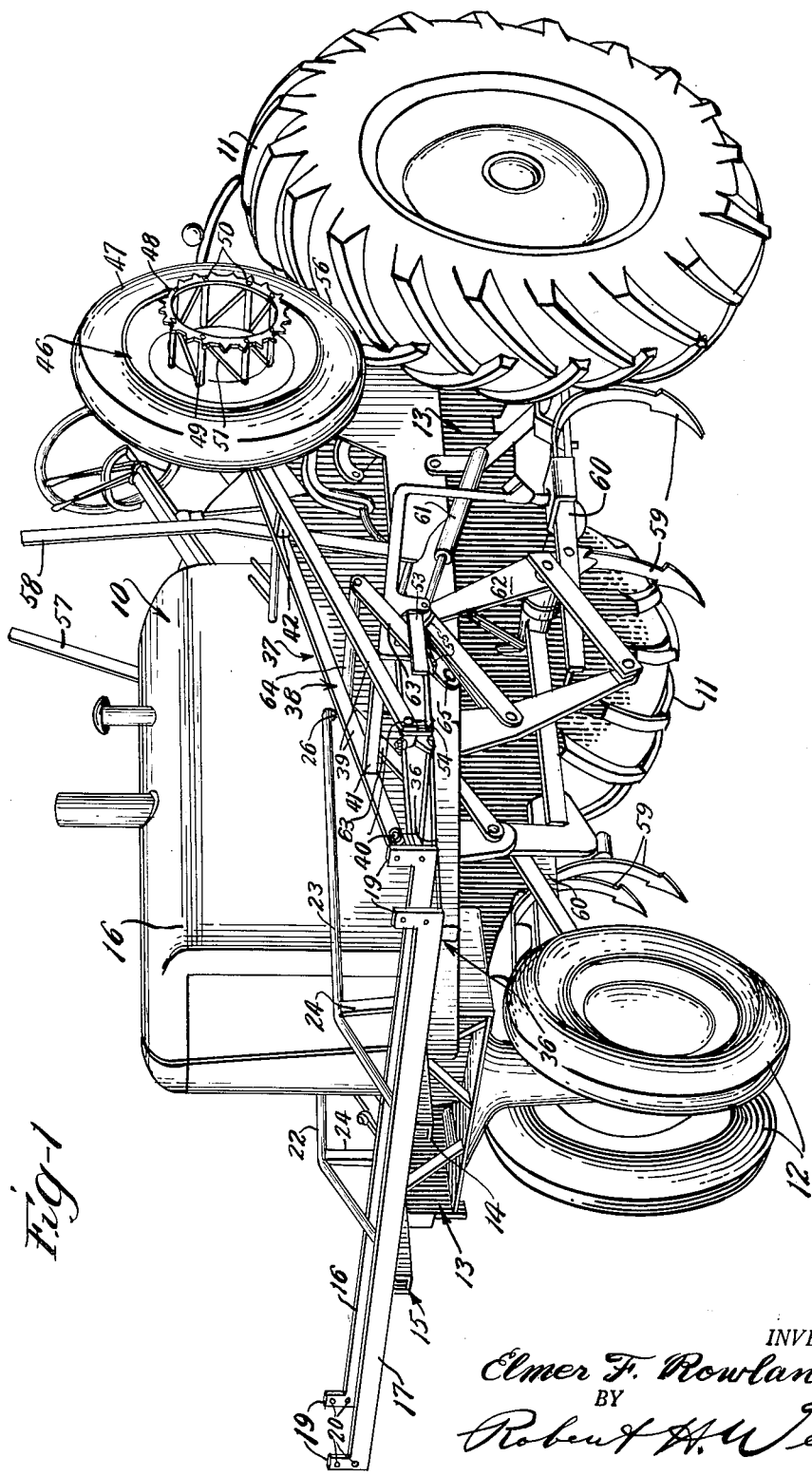

United States Patent Office 2,723,632
Patented Nov. 15, 1955

2,723,632

DRIVE ATTACHMENT FOR TRACTOR-MOUNTED SEEDER AND CULTIVATOR

Elmer F. Rowland, East Lansing, Mich.

Application March 29, 1952, Serial No. 279,325

1 Claim. (Cl. 111—67)

The present invention relates to drive attachments for tractor-mounted seeder and cultivator.

The object of the invention is the provision of an improved tractor-supported tractor-driven seeder or fertilizer which has its drive automatically drawn into tighter engagement with the driving wheel of the tractor by gravity and by any resistance encountered by the driven portion of the drive so that there is no danger of slippage between the drive and the tractor wheel.

Other objects and advantages of the invention will be apparent from the following description and the accompanying drawings, in which similar characters of reference indicate similar parts throughout the several views.

Referring to the drawings accompanying the specification, of which there are two sheets, Fig. 1 is a view in perspective of a tractor assembly including the present invention, with the seeder and drive chain removed;

Fig. 2 is a fragmentary side elevational view, showing the seeder and the cooperating portion of the tractor, the seeder being provided with down spouts for depositing the seed or fertilizer close to the ground so that it will not be blown away by the wind.

Referring to Figs. 1 and 2, 10 indicates in its entirety a tractor, which has the usual large rear drive wheels 11 and the small dirigible front wheels 12 carried upon the tractor frame or chassis 13 in the usual way.

The tractor chassis is provided with additional frame members 14, 15 on each side of the hood 16, suitably secured to the chassis by means of screw bolts (not shown) or by welding, for mounting the present tractor attachments. The two lateral frame members 14 and 15 carry a pair of transversely extending front frame members 16 and 17, which may be substantially as long as the fertilizer or seeder member 18 that is intended to be mounted upon them.

The transverse frame members 16, 17 have upwardly extending flanges 19 at each end provided with apertures 20 for receiving the securing bolts that secure the depending flanges 21 of the seeder or fertilizer spreader to be carried by them. Additional braces in the form of rods 22, 23 are preferably provided on each side of the chassis, suitably secured to the chassis at their forward ends, and passing over a strut 24 in front of the tractor, and attached by welding or otherwise at 25 to the seeder supporting frame members 14 and 15.

The attachment of the braces 23 is shown in Fig. 2 by means of a tension strut 26, which extends from the end 27 of each rod and is attached to the chassis 13 at 28. Thus the rod 23 and its associated strut and rod 26, with the frame members 14 and 15, form a truss on each side of the tractor chassis at the front for supporting the seeder or fertilizer spreader 18.

The seeder or fertilizer spreader 18 may be of various different types, the preferred type being that disclosed in the U. S. Patent to Edmond A. Juzwiak, No. 2,510,231, issued June 6, 1950.

Such a fertilizer spreader includes an elongated trough 29 provided with an opening at its upper end 30 and provided with suitable discharge openings at its lower end discharging into funnel shaped members 31 with depending spouts 32 of rubber or other flexible material, by means of which the seed or fertilizer is carried down and discharged at the lower end 33 of the flexible spouts close to the ground.

The fertilizer or seed is preferably agitated by means of agitators carried by a shaft 34, shown in said patent, and by suitable impellers as shown therein, the shaft 34 being driven by a sprocket 35 for the purpose of causing the seed or fertilizer to feed uniformly through the discharge spouts 32. Any type of suitably agitated seeder or fertilizer spreader may be employed.

The chassis also supports an auxiliary frame member 36 (Fig. 1), which is secured to the chassis and to the two transverse frame members 16, 17 for the purpose of providing a support for the drive mechanism, indicated in its entirety by the numeral 37. The drive mechanism includes a truss-like frame 38, having a pair of frame members 39 pivoted at 40 at their lower ends on the frame members 36 and 14.

The frame members 39 are joined by a brace 41 near the point of pivot and another brace 42 and at their apex 43 (Fig. 2), where they are provided with a pair of bearing flanges 44, which support a fixed shaft 45. The fixed shaft 45 is of the type adapted to support an automobile wheel 46 by means of the usual ball bearings and races.

The automobile wheel is provided with a tire casing 47 containing the usual inflated tube at a suitable pressure. The wheel 46 may be of the disc type; and it supports a sprocket wheel 48 by means of a plurality of spacer tubes 49 and screw bolts 50, with suitable diagonal braces 51. The screw bolts pass through the sprocket, the spacers, both ends of the braces, and the wheel, and are secured by the usual nuts so that the sprocket 48 is supported spaced sufficiently from the wheel to prevent interference between the sprocket chain and the other parts of the assembly.

The chain on the sprocket 48 is indicated at 52 (Fig. 2); and it also passes about the sprocket 35 of the seeder or fertilizer spreader, which it drives. In order to support the slack of the chain, which results from the lifting of the drive wheel 46, a chain guide 53 is pivotally mounted at 54 on the chassis, and comprises a U-shaped member with its bottom wall bent downwardly at 55 at each end to provide a flared opening.

The length of the frame 38 of the driving mechanism is such that the point of contact 56 between the tractor wheel 11 and the driven wheel 46 at the tire 47 tends to draw the wheel 46 into closer engagement with the tractor wheel 11 as the tractor goes forward. The frame 38 acts like a toggle in connection with the wheel 46, the driving tending to draw the wheel down more tightly, and gravity also driving the wheel 46 into driving engagement.

The tractor has the usual levers for manipulation of various attachments, these levers being indicated at 57 and 58 (Fig. 1) and being hand levers with the usual latches and securing sectors (not shown).

The tractor is shown in connection with a standard supporting mechanism for cultivators 59 carried by suitable frames 60 and having hydraulic means 61 and linkage 62 for lifting the cultivator frame. A lever, consisting of elements 63 interconnected by a rod 64 and pivoted to frame members 14 and 36, is swung upwardly when the hydraulic means 61 and linkage 62 are actuated to lift the cultivator frame 60; upward swinging of said lever lifts rod 64 which in turn lifts the drive mechanism frame 38 to disengage wheel 46 from tractor wheel 11. Pivot means 65 pivotally connect one of said elements 63 to frame member 36 and suitable means (not shown) pivot the other element 63 to frame member 14.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A drive attachment for a seeder having a driven sprocket and mounted on the front end of a tractor having rear drive wheels, said tractor also supporting a liftable cultivator and means for lifting the cultivator, a first lever pivotally connected to said tractor at a point spaced forwardly from a rear drive wheel, said first lever extending rearwardly and upwardly toward said drive wheel, a driven wheel rotatably mounted on the rear end of said first lever and carrying a tire, said tire engaging said drive wheel on the forward side of the drive wheel and near but below the top of said drive wheel, the weight of the driven wheel and first lever and resistance to rotation of said driven wheel during rotation of said drive wheel with forward movement of the tractor drawing said driven wheel into tighter engagement with said drive wheel, a sprocket carried by said driven wheel, a chain drivingly interconnecting said sprockets, said first lever and driven wheel being liftable to disengage said wheels and stop the drive, and a second lever comprising a pair of links pivoted to said tractor to swing about an axis and joined by a rod spaced from said axis and passing transversely under said first lever, said second lever being swung upwardly by lifting of said cultivator to lift said rod, said rod engaging said first lever to lift the same to disengage said wheels and stop the drive of said seeder when said cultivator is lifted.

References Cited in the file of this patent

UNITED STATES PATENTS

| Number | Name | Date |
|---|---|---|
| 88,787 | Hewitt et al. | Apr. 13, 1869 |
| 460,399 | Parrott | Sept. 29, 1891 |
| 1,226,515 | Hicks | May 15, 1917 |
| 1,547,271 | Toney | July 28, 1925 |
| 1,533,768 | Schodrowsky | Apr. 14, 1925 |
| 1,613,988 | Flack | Jan. 11, 1927 |
| 1,787,909 | Krueger | Jan. 6, 1931 |
| 1,849,739 | Argabright | Mar. 15, 1932 |
| 2,002,179 | Hitchcock | May 21, 1935 |
| 2,017,304 | Blackney | Oct. 15, 1935 |
| 2,020,732 | Marsh | Nov. 12, 1935 |
| 2,096,910 | McIntosh | Oct. 26, 1937 |
| 2,124,005 | Pancheri | July 19, 1938 |
| 2,184,488 | Conwell | Dec. 26, 1939 |
| 2,190,863 | Dance | Feb. 20, 1940 |
| 2,260,633 | Moorman | Oct. 28, 1941 |
| 2,281,212 | Stolzfus | Apr. 28, 1942 |
| 2,351,389 | Bedard | June 13, 1944 |
| 2,369,759 | Smith | Feb. 20, 1945 |
| 2,396,980 | Blue | Mar. 19, 1946 |
| 2,491,076 | Banazzoli | Dec. 13, 1949 |
| 2,510,231 | Juswiak | June 6, 1950 |
| 2,559,183 | Barnett | July 3, 1951 |
| 2,575,985 | Thompson | Nov. 20, 1951 |